US011815888B1

(12) United States Patent
Mestler

(10) Patent No.: US 11,815,888 B1
(45) Date of Patent: *Nov. 14, 2023

(54) DEPLOYMENT MECHANISM, COMMUNICATION AND OPERATION FOR A HOST-PARASITE DRONE SYSTEM

(71) Applicant: Skyfront Corp., Menlo Park, CA (US)

(72) Inventor: Troy Mestler, Menlo Park, CA (US)

(73) Assignee: Skyfront Corp., Redwood City, CA (US)

( * ) Notice: Subject to any disclaimer, the term of this patent is extended or adjusted under 35 U.S.C. 154(b) by 95 days.

This patent is subject to a terminal disclaimer.

(21) Appl. No.: 17/491,253

(22) Filed: Sep. 30, 2021

Related U.S. Application Data

(63) Continuation of application No. 17/228,244, filed on Apr. 12, 2021, now Pat. No. 11,175,655.

(60) Provisional application No. 63/010,473, filed on Apr. 15, 2020.

(51) Int. Cl.
*G05D 1/00* (2006.01)
*B64C 39/02* (2023.01)
*G08G 5/00* (2006.01)
*B64U 101/30* (2023.01)

(52) U.S. Cl.
CPC ......... *G05D 1/0027* (2013.01); *B64C 39/024* (2013.01); *G05D 1/0022* (2013.01); *G08G 5/0013* (2013.01); *B64U 2101/30* (2023.01)

(58) Field of Classification Search
CPC .. G05D 1/0027; G05D 1/0022; B64C 39/024; G08G 5/0013; B64U 2101/30

USPC ............................................................ 701/3
See application file for complete search history.

(56) References Cited

U.S. PATENT DOCUMENTS

| | | | |
|---|---|---|---|
| 11,175,655 B1 * | 11/2021 | Mestler | B64U 80/82 |
| 2003/0164794 A1 | 9/2003 | Haynes | |
| 2013/0200207 A1 | 8/2013 | Pongratz | |
| 2016/0046387 A1 | 2/2016 | Frolov | |
| 2016/0050012 A1 | 2/2016 | Frolov | |
| 2016/0304217 A1 * | 10/2016 | Fisher | B60L 53/51 |
| 2017/0225781 A1 | 8/2017 | Almasoud | |
| 2018/0319495 A1 | 11/2018 | Tu | |
| 2019/0100307 A1 | 4/2019 | Beltman | |
| 2019/0100315 A1 | 4/2019 | Theiss | |
| 2019/0235489 A1 | 8/2019 | Cantrell | |
| 2020/0033892 A1 | 1/2020 | Aldarwish | |
| 2021/0107652 A1 * | 4/2021 | Velazquez | B64D 47/08 |

* cited by examiner

*Primary Examiner* — Tyler D Paige
(74) *Attorney, Agent, or Firm* — Van Pelt, Yi & James LLP

(57) ABSTRACT

A carrier aerial vehicle system includes a propulsion component configured to enable the carrier aerial vehicle system to be in flight. The carrier aerial vehicle system further includes a retention mechanism configured to allow a plurality of deployable parasite aerial vehicles to be coupled to the retention mechanism and released from the retention mechanism while the carrier aerial vehicle system is in flight. The carrier aerial vehicle system further includes a communication component configured to enable the carrier aerial vehicle system to wireless communicate with the plurality of parasite deployable aerial vehicles. The carrier aerial vehicle system further includes a processor configured to determine a position on the retention mechanism for each deployable parasite aerial vehicle of the plurality of deployable parasite aerial vehicles.

20 Claims, 13 Drawing Sheets

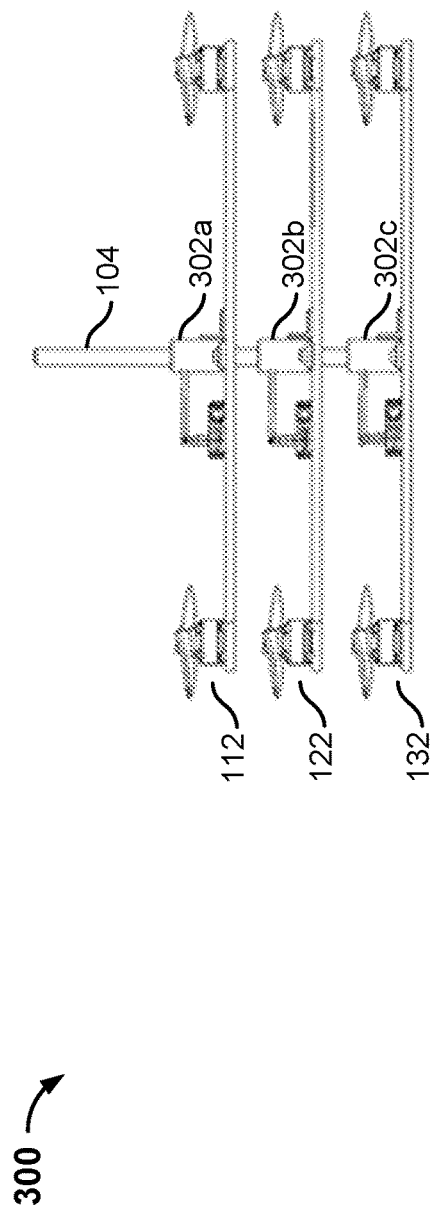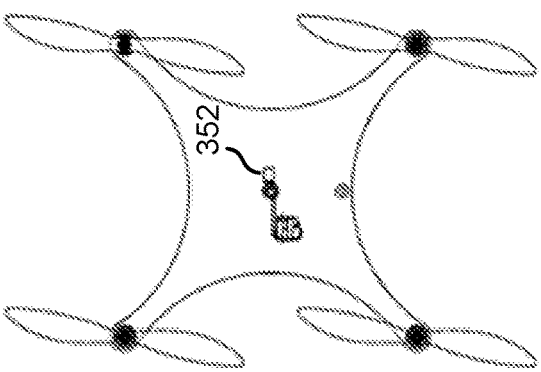
FIG. 3A
FIG. 3B

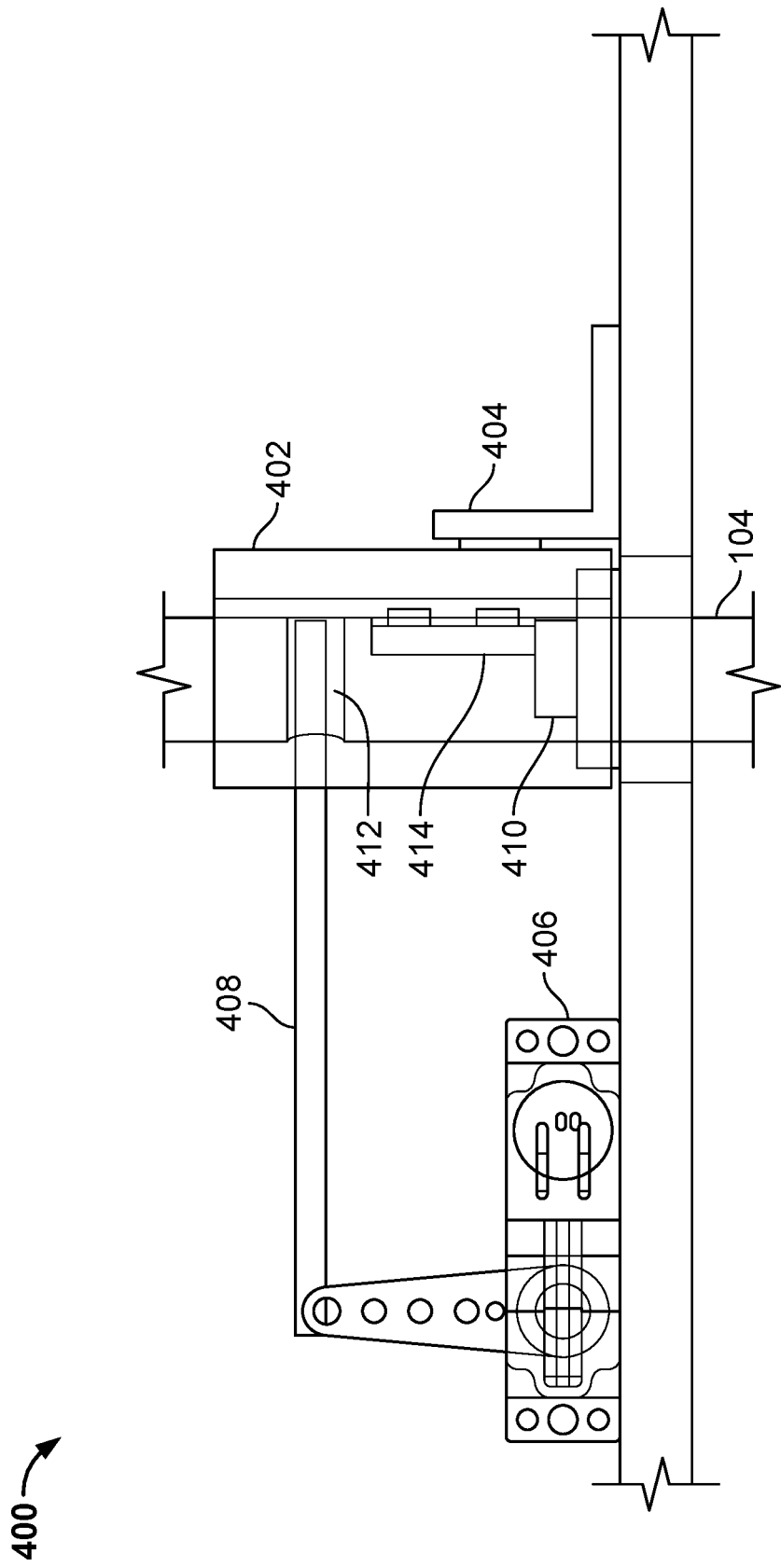

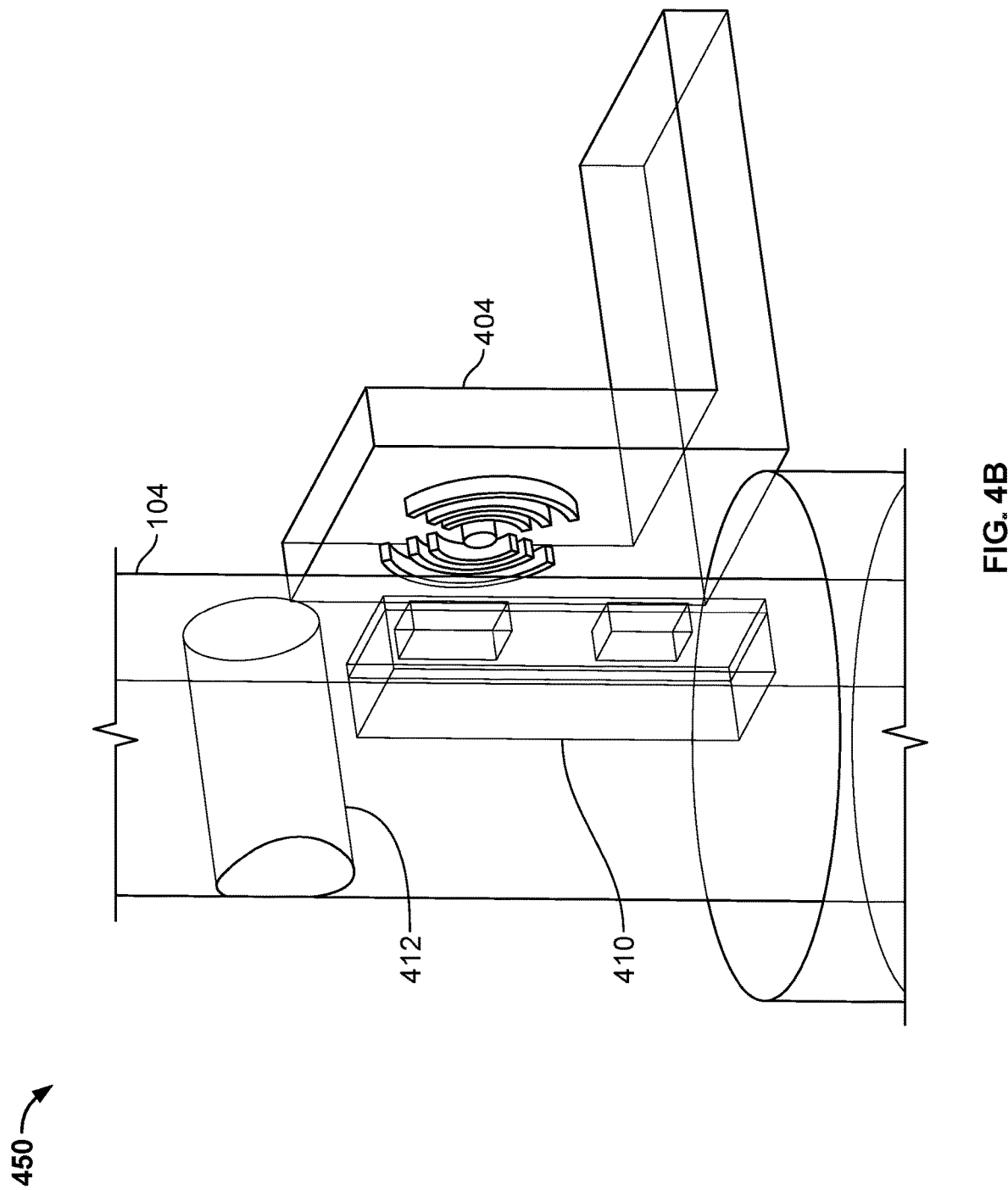

DEPLOYMENT MECHANISM, COMMUNICATION AND OPERATION FOR A HOST-PARASITE DRONE SYSTEM

CROSS REFERENCE TO OTHER APPLICATIONS

This application is a continuation of U.S. patent application Ser. No. 17/228,244, entitled DEPLOYMENT MECHANISM, COMMUNICATION AND OPERATION FOR A HOST-PARASITE DRONE SYSTEM filed Apr. 12, 2021, which claims priority to U.S. Provisional Patent Application No. 63/010,473, entitled DEPLOYMENT MECHANISM, COMMUNICATION AND OPERATION FOR A HOST-PARASITE DRONE SYSTEM filed Apr. 15, 2020, each of which is incorporated herein by reference for all purposes.

BACKGROUND OF THE INVENTION

An unmanned aerial vehicle (UAV) may be deployed for reconnaissance purposes. Battery-powered UAVs (e.g., drones) are typically quieter than other aircraft, such as helicopters, airplanes, etc., which may generate loud noise from their propulsion system(s) (e.g., jet engine, internal combustion engine, propellers or rotors, etc.). This may allow the UAV to fly to a region of interest without being detected.

A UAV may be equipped with one or more imaging devices (e.g., camera). UAVs often use point-to-point radios to communicate with an operator and a ground control station. The UAV may communicate data obtained via the one or more imaging devices to the ground control station using a point-to-point radio. Point-to-point radios depend on line of sight between the UAV's radio and a ground radio at the ground control station to function optimally. However, terrain (e.g., mountains), vegetation, and buildings often obstruct the radio signal, leading to reduced communications range. UAVs are also typically battery-powered, which limits the flight time due to limitations in battery energy density.

BRIEF DESCRIPTION OF THE DRAWINGS

Various embodiments of the invention are disclosed in the following detailed description and the accompanying drawings.

FIG. 3A is a diagram illustrating a side view of an embodiment of the retention mechanism.

FIG. 3B illustrates a top-down view of a parasite aerial vehicle in accordance with some embodiments.

FIG. 4A is a diagram illustrating a portion of a parasite aerial vehicle in accordance with some embodiments.

FIG. 4B is a diagram illustrating a view of a parasite aerial vehicle in accordance with some embodiments.

DETAILED DESCRIPTION

Figure 1A:
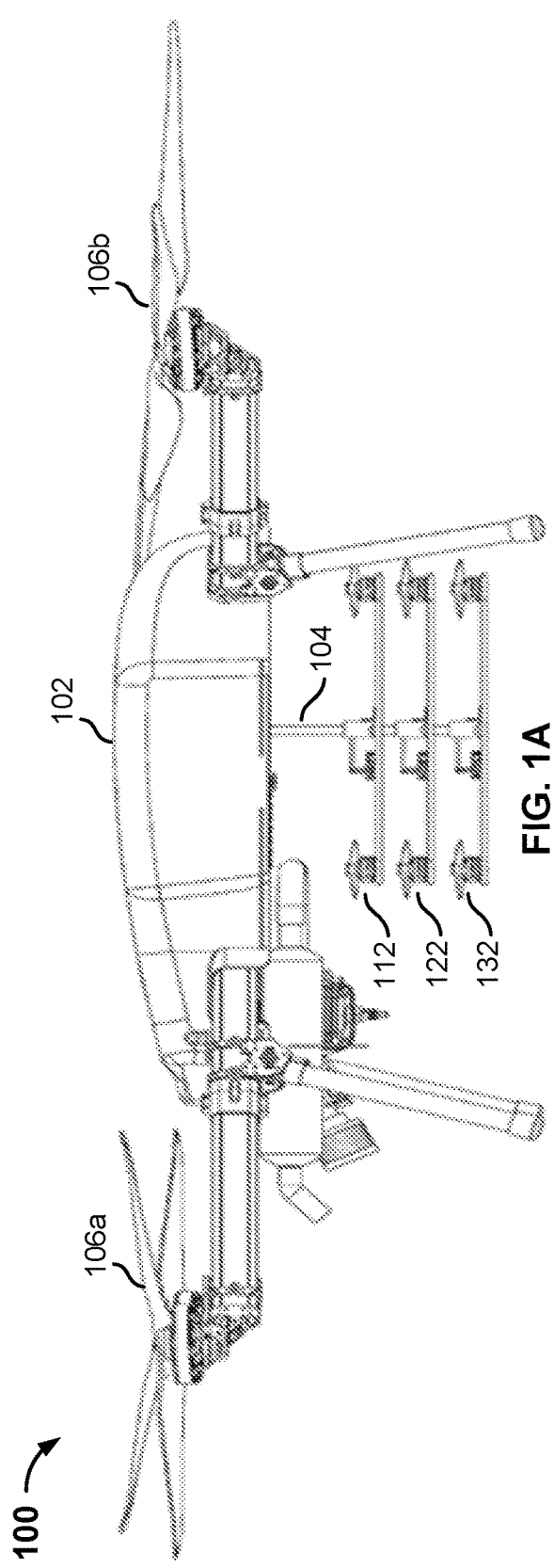
FIG. 1A is a diagram illustrating a side view of a system for deploying parasite aerial vehicles in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Using the techniques described herein, line of sight communication issues and flight time limitations associated with a UAV are reduced by attaching the UAV (referred to herein as a "parasite aerial vehicle") to a host aircraft (also referred to as a "carrier aerial vehicle system") that has longer endurance and flies at an altitude high enough such that line of sight is maintained with a ground control system. The host aircraft may fly to a deployment location where it will not be detected at a region of interest. One or more parasite aerial vehicles may detach from the host aircraft and fly closer to the region of interest without being detected. Control, data, and video links between the one or more parasite aerial vehicles are relayed to the ground control station through the host aircraft, which has line of sight with both the one or more parasite aerial vehicles and the ground control station.

The host aircraft includes a retention mechanism that is configured to allow one or more parasite aerial vehicles to be coupled to the retention mechanism and released from the retention mechanism while the host aircraft is in flight. Each of the parasite aerial vehicles has an opening that allows the retention mechanism to pass through. A plurality of parasite aerial vehicles may be vertically stacked, such that the retention mechanism passes through each of the plurality of parasite aerial vehicles. Each of the parasite aerial vehicles includes an attachment component. The attachment component includes a release pin. The retention mechanism includes one or more attachment openings. The number of attachment openings corresponds to the number of parasite aerial vehicles to which the retention mechanism is capable of being coupled. A parasite aerial vehicle is coupled to the retention mechanism by inserting the release pin into one of the attachment openings of the retention mechanism.

The host aircraft may carry a plurality of parasite aerial vehicles to a deployment location near a region of interest. The host aircraft may send to one of the parasite aerial vehicles, a command to release a release pin from an attachment opening. Gravity causes the parasite aerial vehicle to slide off of the retention mechanism and fall towards the ground. After being released for a period of time, the parasite aerial vehicle can engage its propulsors and then fly to the region of interest. However, unless the host aircraft determines the position on the retention mechanism for each parasite aerial vehicle, the host aircraft is unable to determine an order in which the plurality of parasite aerial vehicles are to be deployed.

Prior to takeoff, the host aircraft may register a placement location of each of the parasite aerial vehicles with respect to the retention mechanism. The retention mechanism includes a plurality of placement locations at which a parasite aerial vehicle can couple. Each of the plurality of placement locations is associated with a corresponding proximity tag. Each of the proximity tags is associated with a proximity identifier. Each of the plurality of parasite aerial vehicles includes a corresponding proximity sensor, a corresponding microcontroller, and a corresponding unit. A proximity sensor is configured to scan for the presence of a proximity tag. When a proximity tag is detected and read, the proximity sensor provides the proximity identifier to the microcontroller. When the release pin is inserted into the attachment opening, the proximity identifier is transmitted to the host aircraft via the communications unit associated with the parasite aerial vehicle. In response to receiving the proximity identifier, the host aircraft is configured to update a data structure that associates parasite aerial vehicles with the corresponding placement location on the retention mechanism. After a plurality of parasite aerial vehicles send their corresponding proximity identifiers to the host aircraft, the host aircraft is able to determine the order in which the plurality of parasite aerial vehicles are to be deployed. This ensures that the plurality of parasite aerial vehicles are deployed in the correct order without damaging any of the other parasite aerial vehicles.

FIG. 1A is a diagram illustrating a side view 100 of a system for deploying parasite aerial vehicles in accordance with some embodiments. In the example shown, the system includes a host aircraft 102 coupled to parasite aerial vehicles 112, 122, 132 via retention mechanism 104. Although FIG. 1A illustrates host aircraft 102 being coupled to three parasite aerial vehicles, host aircraft 102 may be coupled to 1:n parasite aerial vehicles, where n corresponds to a maximum number of placement locations associated with a retention mechanism. In some embodiments, the maximum number of placement locations associated with a retention mechanism corresponds to the maximum number of parasite aerial vehicles that host aircraft 102 is capable of transporting without reducing a performance of host aircraft 102.

In some embodiments, host aircraft 102 includes any type of aircraft including but not limited to a fixed-wing aircraft or rotary-wing aircraft, whether manned or unmanned. Host aircraft 102 includes propulsors 106a, 106b. In some embodiments, a propulsor includes a device that generates thrust necessary to keep host aircraft 102 aloft. Examples of propulsors include but are not limited to propellers attached to gasoline motors, electric motors, jet engines, or rocket engines.

A well-known deficiency of battery powered aircrafts is their short flight time. In some embodiments, host aircraft 102 has a series-hybrid power source, including both a battery and an electric generator (e.g., driven by a prime mover (genset)) used to power the aircraft. An example of a prime mover is an internal combustion engine or a turbine engine. A series-hybrid aircraft is capable of much longer flight times because chemical fuels (e.g., gasoline, diesel, hydrogen, natural gas, etc.) have much higher energy density than current battery technologies. In some embodiments, a flight controller of host aircraft 102 regulates power generation and power utilization to eliminate reliance of battery power when using a generator with a throttle delay. The flight controller includes an electronic speed control (ESC) throttle input from which an anticipated electrical power demand is determined. For example, based on control inputs from a user and detected sensor data, the throttle settings to be applied to electric motors to achieve desired propeller speeds are determined and the associated anticipated power demand is determined. Examples of the anticipated electrical power demand include predicted electrical power demand, estimated electrical power demand and any other calculated electrical power demand. In various embodiments, the anticipated electrical power demand is at least in part determined by the flight controller and/or another processor included on the aircraft vehicle. The controller determines a throttle input (e.g., engine throttle input) for a generator in order to satisfy the anticipated electrical demand. For example, engine throttle required to produce the anticipated electrical demand is determined and applied. The flight controller includes an electronic speed control throttle output providing a delayed electronic speed control throttle signal. For example, rather than allowing the electrical motor throttle to instantaneously change, the electrical motor throttle is allowed to change in a manner that matches the power output delay of the generator. By delaying the change in electronic speed control throttle, the increase in power demand from the change in the electronic speed control throttle can be matched to the delay in power increase provided by the generator in response to the generator throttle input.

Host aircraft 102 includes a processor and a communications unit. The processor is configured to send one or more commands to parasite aerial vehicles 112, 122, 132 via the communications unit (e.g., radio). The processor is configured to receive data from parasite aerial vehicles 112, 122, 132 via the communications unit.

In some embodiments, parasite aerial vehicles 112, 122, 132 include any unmanned aircraft including but not limited to a fixed-wing aircraft or a rotary-wing aircraft.

Figure 1B:
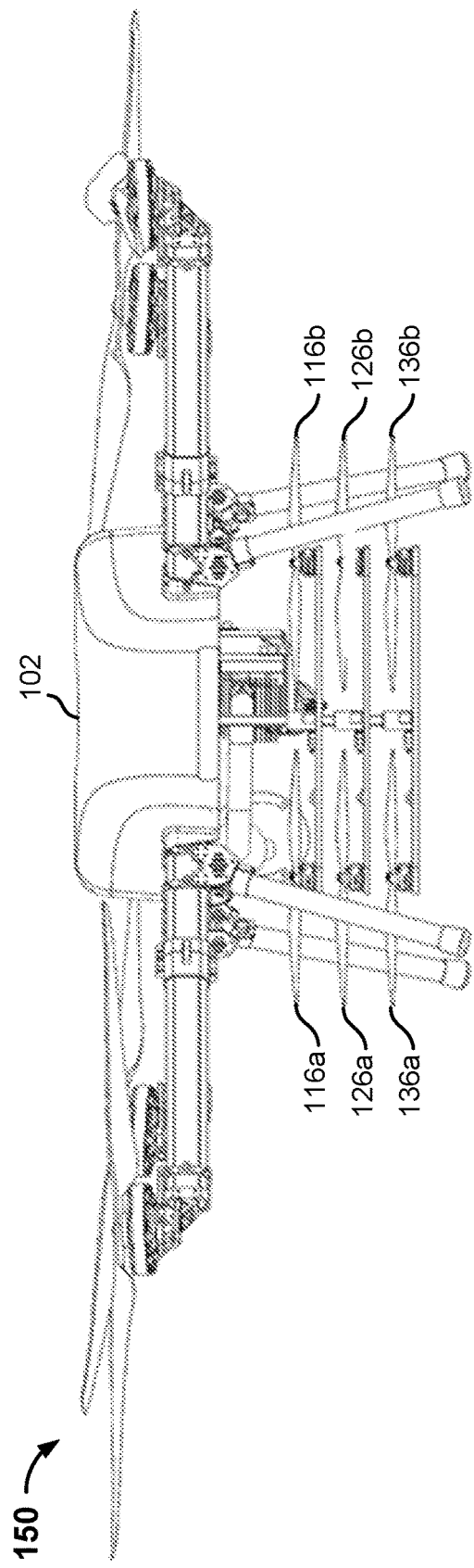
FIG. 1B is a diagram illustrating a front view of a system for deploying parasite aerial vehicles in accordance with some embodiments.

FIG. 1B is a diagram illustrating a front view 150 of a system for deploying parasite aerial vehicles in accordance with some embodiments. Parasite aerial vehicles 112, 122, 132 are coupled to host aircraft 102 via retention mechanism 104.

When coupled to host aircraft 102 via retention mechanism 104, the propulsors of parasite aerial vehicles 112, 122, 132 (i.e., propulsors 116a, 116b, 126a, 126b, 136a, 136b) are in a low-power or disengaged (motionless) state so that the parasite aerial vehicles 112, 122, 132 can conserve energy during transport. Propulsors 116a, 116b, 126a, 126b, 136a, 136b may be propellers attached to electric motors.

In the low-power or disengaged state, the parasite aerial vehicles 112, 122, 132 are capable of communicating with host aircraft 102 via their communications units (e.g., radio), but are communicating using a reduced amount of radio power (e.g., less than the amount of radio power used during normal operation of a parasite aerial vehicle). In the low-power or disengaged state, the parasite aerial vehicles 112, 122, 132 are capable of transmitting data to host aircraft 102 using a low data rate. For example, a camera data rate may be reduced or turned off. The parasite aerial vehicles 112, 122, 132 may be placed in a dormant state when being transported to the destination location.

Parasite aerial vehicles 112, 122, 132 may be battery powered. When their propulsors are engaged, parasite aerial vehicles 112, 122, 132 are quieter than when the propulsors 106a, 106b of host aircraft 102 are engaged. This allows parasite aerial vehicles 112, 122, 132 to fly close to a region of interest than host aircraft 102 could without being detected. Parasite aerial vehicles 112, 122, 132 may include one or more imaging devices that enable them to obtain higher resolution video and imagery of the regions of interest without detection. Parasite aerial vehicles 112, 122, 132 are capable of flying into enclosed areas (e.g., buildings) or narrow areas (e.g., between trees, between buildings), whereas host aircraft 102 would not fit.

Figure 2:
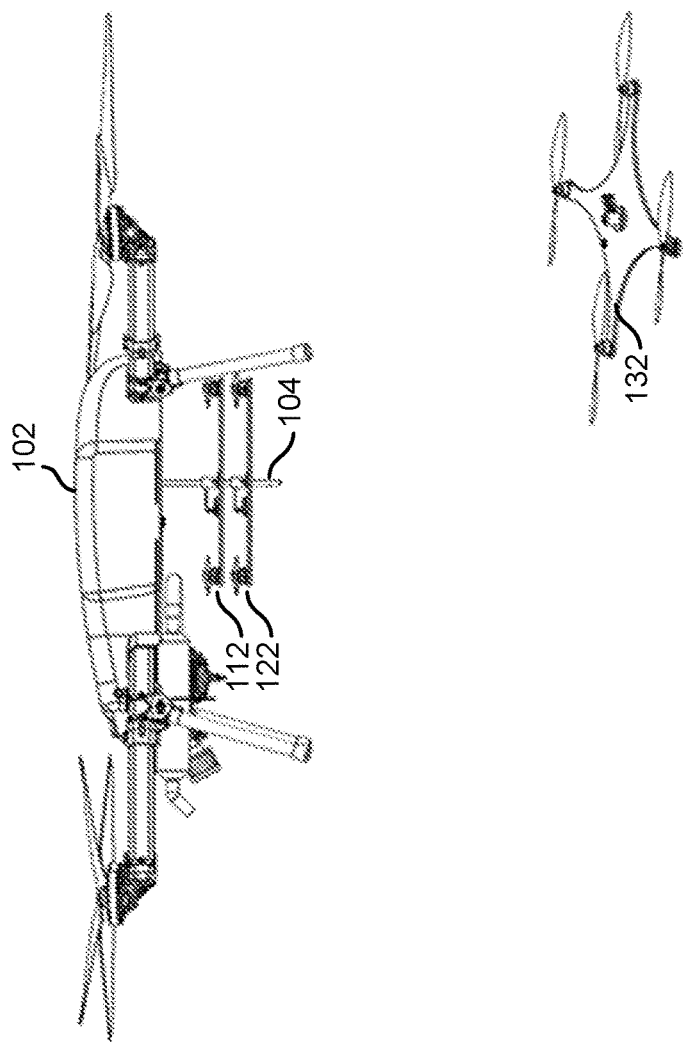
FIG. 2 is a diagram illustrating an embodiment of a deployed parasite aerial vehicle.

FIG. 2 is a diagram illustrating an embodiment of a deployed parasite aerial vehicle. Host aircraft 102 stores a data structure that indicates an order in which the parasite aerial vehicles 112, 122, 132 are attached to retention mechanism 104. After reaching a deployment location near a region of interest, host aircraft 102 may send corresponding commands to the parasite aerial vehicles 112, 122, 132 to detach from host aircraft 102 based on the order. In the example shown, host aircraft sent to parasite aerial vehicle 132 a command to detach from host aircraft 102.

In response to receiving the command, parasite aerial vehicle 132 detaches from retention mechanism 104. After a delay, the propulsors of parasite aerial vehicle 132 are engaged or removed from a low-power state to a high-power state, allowing parasite aerial vehicle 132 to gain separation from host aircraft 102 and then fly under its own power. In some embodiments, the delay is a fixed amount of time. The amount of delay may prevent the parasite aerial vehicle 132 from accidentally colliding with other parasite aerial vehicles that are to be deployed. The amount of delay may also prevent the parasite aerial vehicle 132 from accidentally crashing due to the inability of parasite aerial vehicle 132 to overcome the acceleration forces from gravity.

In some embodiments, the delay is variable and based one or more factors, such as a current altitude of the host aircraft, the number of other parasite aerial vehicles attached to host aircraft 102 via retention mechanism, current environmental conditions (e.g., wind, snow, rain, temperature, etc.).

In some embodiments, host aircraft 102 transmits to a parasite aerial vehicle via a communications unit a command to engage its propulsors. In some embodiments, a microcontroller of a parasite aerial vehicle issues an engage command to a motor associated with the propulsors.

Host aircraft 102 may wait a particular amount of time before issuing subsequent release commands to parasite aerial vehicles 112, 122. This may prevent a collision between the deployed parasite aerial vehicle(s), such as parasite aerial vehicle 132, by providing sufficient amount of time for the deployed parasite aerial vehicle(s) to distance themselves from host aircraft 102 and the other parasite aerial vehicle(s).

FIG. 3A is a diagram illustrating a side view of an embodiment of the retention mechanism. In the example shown, retention mechanism 104 is inserted into corresponding collars 302a, 302b, 302c of parasite aerial vehicles 112, 122, 132. A parasite aerial vehicle includes a release button (shown as release button 352 in FIG. 3B). When pressed, a release pin is opened allowing the parasite aerial vehicle to move up and down retention mechanism 104. An operator may orient and move the parasite aerial vehicle at the highest open attachment point on retention mechanism 104. When release button 352 is released, the release pin is inserted into an attachment opening on retention mechanism 104.

Retention mechanism 104 is configured to attach to a host aircraft. In some embodiments, retention mechanism 104 allows the following features: (1) mechanically simple, reliable and easy to build; (2) occupies a small amount of space on the host; (3) reduces weight and aerodynamic drag; (4) does not interfere with the host aircraft's propulsors; (5) reduces setup time by allowing the operator to identify and control individual parasite drones that are identical in all respects except their position; (6) increases transportability; and (7) reduces radio interference and frees up network resources.

In some embodiments, retention mechanism 104 (e.g., a rod) includes any long protrusion, which can be inserted into an opening or partial opening on a parasite aerial vehicle, along which the parasite aerial vehicle can travel freely. Retention mechanism 104 does not need to be rigid or straight, and it may consist of a chain of smaller such rods linked together. Other embodiments and shapes of retention mechanism 104 may exist.

Retention mechanism 104 may be detached from a host aircraft for each of transport of both the host aircraft and the parasite aerial vehicles. Retention mechanism 104 may come in different sizes and shapes. This allows host aircraft 102 to transport different types and/or numbers of parasite aerial vehicles. In some embodiments, a plurality of parasite aerial vehicles are preloaded onto a plurality of retention mechanisms, enabling host aircraft 102 to quickly attach and transport the plurality of parasite aerial vehicles to a destination location.

Figure 7:
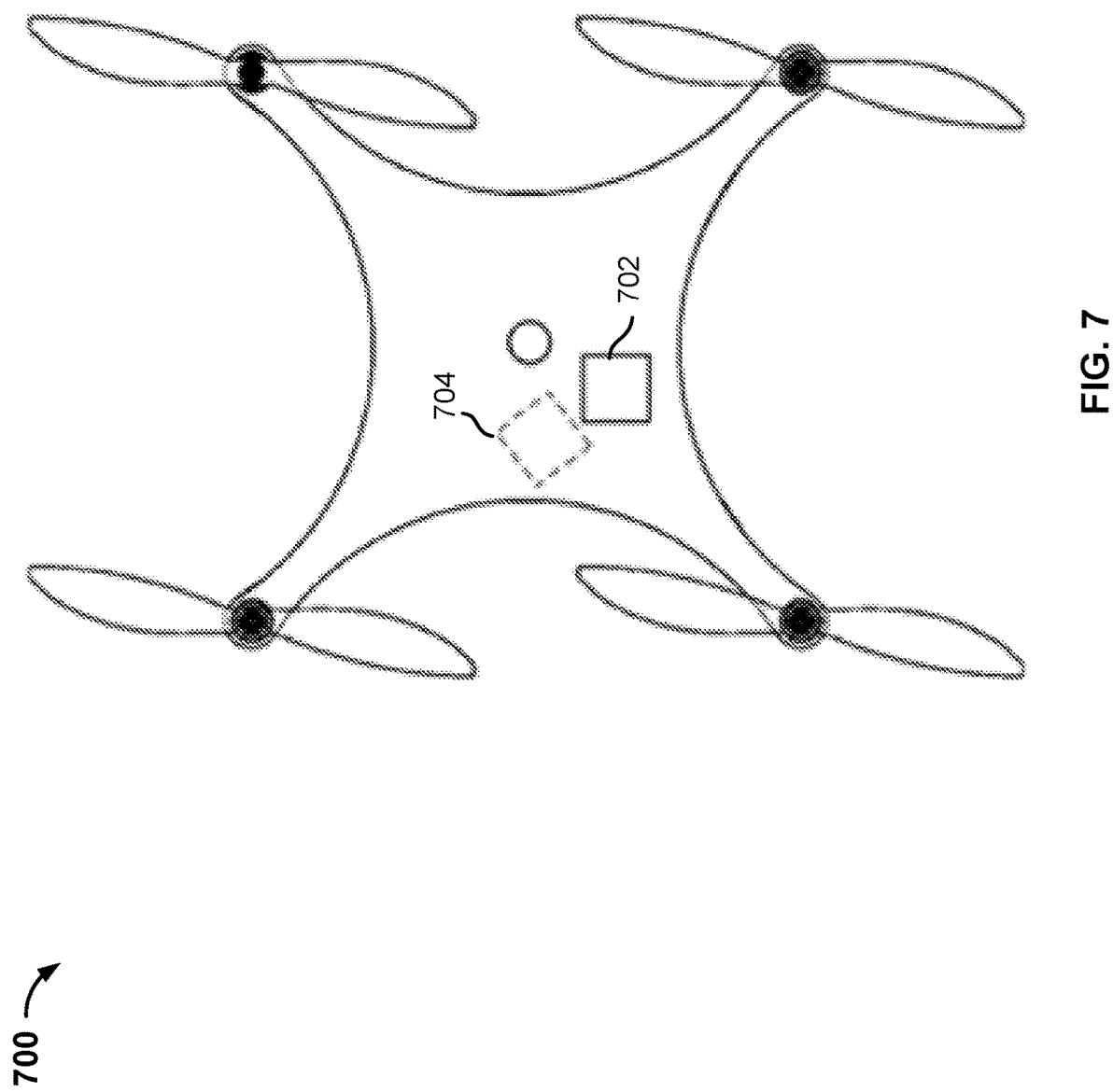
FIG. 7 illustrates a top-down view of a parasite aerial vehicle in accordance with some embodiments.

An embodiment of a parasite aerial vehicle has multiple onboard components, including a radio, radio antennas, a global navigation satellite system (GNSS) antenna, cameras, motors and propellers. These components may have heights that cannot be reduced and consequently contribute to the vertical profile of the parasite aerial vehicle stack. To reduce the vertical profile, a set of holes, hollow areas or recessions (e.g., hollow area 702 and recession 704 of FIG. 7) may be designed into the parasite aerial vehicle airframe to fit around the components of the parasites aerial vehicles above and below it when the parasite aerial vehicles are stacked.

FIG. 4A is a diagram illustrating a portion of a parasite aerial vehicle in accordance with some embodiments. In the example shown, parasite aerial vehicle 400 includes a collar 402, a proximity sensor 404, an electronics and mechanical components housing 406, a release pin 408, and a release button 410. Parasite aerial vehicle 400 is coupled to retention mechanism 104 via an attachment opening 412. Release pin 408 is inserted into attachment opening 412 on retention mechanism 104, locking parasite aerial vehicle 400 into place. In some embodiments, release pin 408 or "pin" includes any protrusion that can be inserted into retention mechanism 104 and fixes a parasite aerial vehicle in place.

Electronics and mechanical components housing 406 includes a plurality of onboard components, including, but not limited to a microcontroller, a radio, radio antennas, a global navigation satellite system (GNSS) antenna, a radio communications device, and a motive device. The motive device may be a servo or stepper motor. To release a parasite aerial vehicle 400, release pin 408 is removed from attachment opening 412 allowing the parasite aerial vehicle 400 to fall down retention mechanism 104. Retention mechanism 104 may include a plurality of attachment openings. In some embodiments, an attachment opening or "opening" is any opening, notch or partial hole in retention mechanism 104 that is used to attach a parasite aerial vehicle to a host aircraft. Each attachment opening is spaced such that multiple parasite aerial vehicles can be fit onto the retention mechanism 104. Parasite aerial vehicle 400 may receive a command to release itself from retention mechanism 104. The command may be received from a host aircraft, such as host aircraft 102, via a radio onboard the host aircraft.

Figure 5:
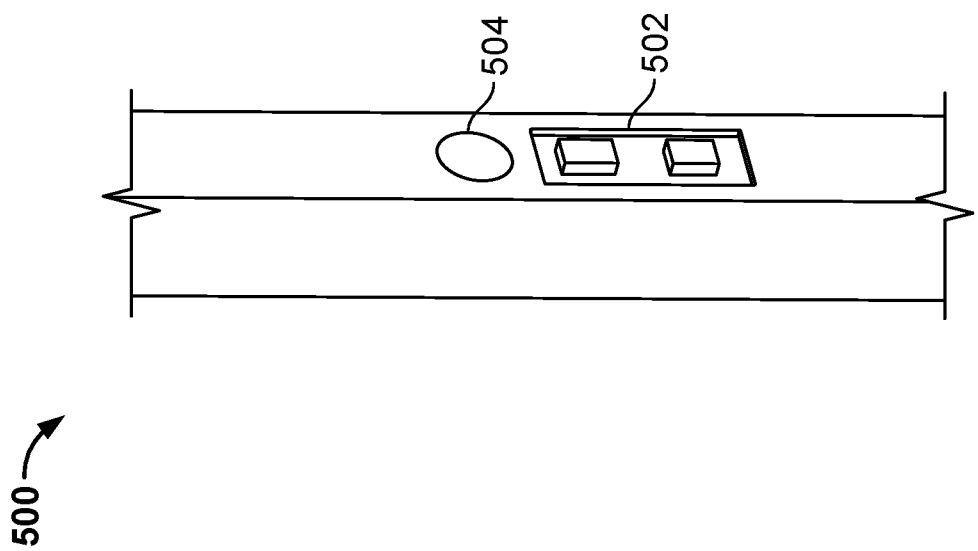
FIG. 5 is a diagram illustrating a retention mechanism in accordance with some embodiments.

Retention mechanism 104 and collar 402 may be keyed to aid alignment of the release pin 408 with attachment opening 412. An embodiment of this keying includes giving the retention mechanism 104 and collar 402 a flat face 502 as shown in FIG. 5. Collar 402 provides stability when attached to retention mechanism 104. The top of the retention mechanism 104 may also have an embedded proximity tag which contains a list of all the proximity identifiers on retention mechanism 104 ordered by position on retention mechanism 104. This information is read by a proximity sensor on the host aircraft and stored. This information is helpful in allowing the attachment of different retention mechanisms which do not have the same sets of proximity identifiers.

Figure 6:
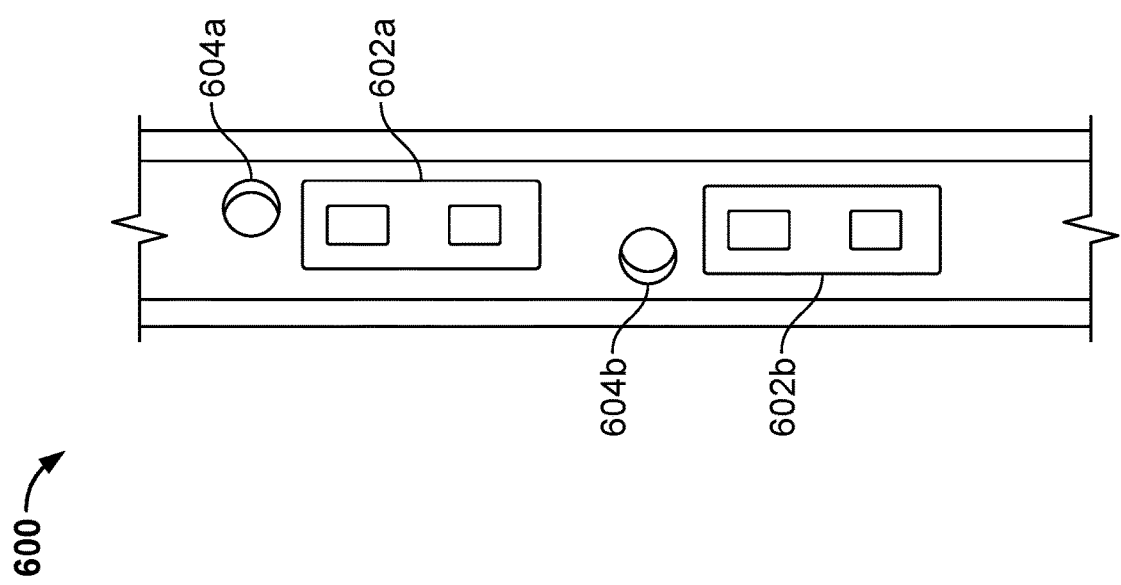
FIG. 6 is a diagram illustrating a retention mechanism in accordance with some embodiments.

The rotation of the attachment openings and keying faces about the axis of the retention mechanism may vary along the length of the rod. As seen in FIG. 6, the attachment openings 604a, 604b and keying faces 602a, 602b are rotated about the axis of the retention mechanism. This rotation would aid in fitting multiple parasite aerial vehicles into the smallest space possible by allowing a parasite aerial vehicle's components to fit into vacant spaces of the parasite aerial vehicles above and below it.

FIG. 4B is a diagram illustrating a view of a parasite aerial vehicle in accordance with some embodiments.

In the example shown, proximity sensor 404 is near proximity tag 410. In order to release and control each parasite aerial vehicle that is coupled to a host aircraft, the placement location on retention mechanism 104 for each parasite aerial vehicle needs to be identified.

Retention mechanism 104 may include a plurality of proximity tags and a plurality of attachment openings. The plurality of proximity tags may be embedded into retention mechanism 104. Each proximity tag corresponds to one of the attachment openings and is embedded somewhere near it. As seen in FIG. 4B, proximity tag 410 corresponds to attachment opening 412. Each proximity tag contains a pre-programmed identifier (e.g., proximity identifier) that is at least unique with respect to other tags on the same rod. In some embodiments, a proximity tag includes any visual, electronic or electromagnetic device that contains data that can be read or detected by a proximity sensor. It can be used to identify the position of a parasite aerial vehicle along the length of a retention mechanism. In some embodiments, a proximity identifier includes a piece of data or sequence of bytes that is unique to a proximity system and is stored on a proximity tag.

In some embodiments, a Proximity System includes the combined system of Proximity Tags and Proximity Sensors. The Proximity Tags can be either all mounted on retention mechanism 104 or on a parasite aerial vehicle. Examples of proximity systems include but are not limited to Near-Field Communication (NFC), barcode scanners or Radio Frequency Identification (RFID). All of the proximity tags may be mounted on the parasite aerial vehicle or on the retention mechanism, and each parasite aerial vehicle may carry either a proximity sensor or a proximity tag, but not both.

A proximity sensor may be mounted on each parasite aerial vehicle. In some embodiments, a proximity sensor includes a device that reads data from or detects proximity tags. The proximity sensor may continually scan for the presence of a proximity tag. When a proximity tag is detected and read, the corresponding proximity identifier is read into a microcontroller onboard the parasite aerial vehicle. When the release pin is inserted into the attachment opening, the proximity identifier is transmitted to the host aircraft via a radio of the parasite aerial vehicle so that the host aircraft can detect the position of that particular parasite aerial vehicle on the retention mechanism.

In some embodiments, without loss of generality, the proximity sensors are embedded into the retention mechanism and readable by the host aircraft, and the proximity tags are mounted onto the parasite aerial vehicles. In some embodiments, a proximity sensor at a location on the retention mechanism reads a proximity identifier associated with a proximity tag and provides the proximity identifier to the host aircraft. In some embodiments, a microprocessor of the parasite aerial vehicle accesses its proximity identifier associated with the proximity tag and sends, via a radio, the proximity identifier to the host aircraft. In response, the host aircraft is configured to update a data structure, which associates the proximity sensor with the proximity sensor's location on the retention mechanism, the IP addresses of the parasite aerial vehicle, and the proximity identifier of the parasite aerial vehicle.

Figure 8:
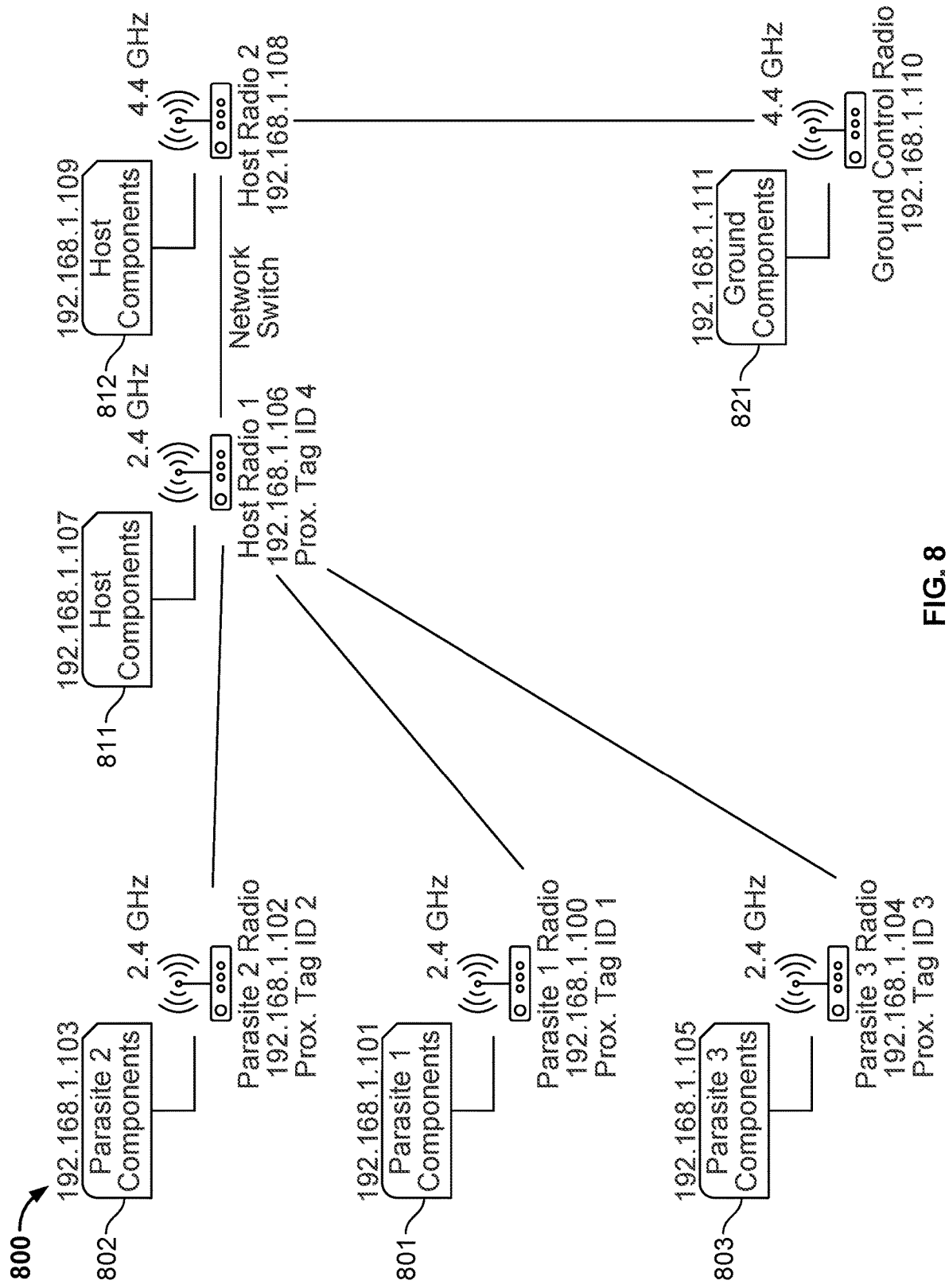
FIG. 8 is a diagram illustrating a communication system in accordance with some embodiments.

FIG. 8 is a diagram illustrating a communication system in accordance with some embodiments. In the example shown, a first parasite aerial vehicle, a second parasite aerial vehicle, and a third parasite aerial vehicle are configured to use corresponding communication components 801, 802, 803 to communicate with a host aircraft via communication component 811. Each parasite aerial vehicle and the host aircraft may be equipped with an internet protocol (IP) radio that are configured to be on the same network, such as by setting all radios' network identifiers to be equal and/or to use the same subnet mask. Each radio allows the aircrafts, whether parasite aerial vehicle or host aircraft, and their communication components to transmit to and receive data from any other node (e.g., another parasite aerial vehicle or the host aircraft) on the network. Examples of data include video, telemetry, authentication messages and commands.

The host aircraft may use one radio to communicate with both the parasite aerial vehicles and the ground control station. It may also use two radios separate radios connected (with a network switch, for example) for communicating with both the parasite aerial vehicles and the ground control station, respectively. In the example shown, the host aircraft includes a first set of communication components 811 that includes a first radio and a second set of communication components that includes a second radio. The host aircraft is configured to use the first set of communication components 811 to communicate with the first, second, and third parasite aerial vehicles. The host aircraft is configured to use the second set of communication components 812 to communicate with the communication components 821 located at a ground control station. The host aircraft may be configured to use a first frequency (e.g., 2.4 GHz) to communicate with the parasite aerial vehicles and a second frequency (e.g., 4.4 GHz) to communicate with the ground control station in order to prevent interference.

Each radio and any network components (e.g., cameras and computers) connected to the radio must have a unique identifier and an IP address, in order to transmit and receive data on the network. A Dynamic Host Configuration Protocol (DHCP) server is run on the host aircraft that assigns IP addresses to the parasite aerial vehicles' radios and network components. The IP addresses of the host aircraft's and the ground control station's radios and components may be set to be static (i.e., not assigned by the DHCP server).

Each parasite aerial vehicle's network components may authenticate with the host aircraft and identify themselves as part of the parasite. After authentication, the parasite aerial vehicles may transmit data (e.g., video and telemetry) to and receive commands from the host aircraft and/or from the ground control station. If the data is transmitted to or from the ground control station, the data is routed to the parasite aerial vehicle's via the host aircraft's radios.

For each attached parasite aerial vehicle, a message or set of messages, associating at least some of the parasite aerial vehicle's radio and network components IP addresses with the proximity tag ID read by the parasite aerial vehicle's proximity sensor, may be generated by the parasite aerial vehicle. This information is sent to both the host aircraft and to the ground control station. The information can be also stored on the host aircraft and ground control station for selectively communicating with particular parasite aerial vehicles.

Parasite aerial vehicles may have network components (e.g., cameras) that send data at high rates. That data might be unutilized by the host aircraft or the ground control station when the parasite aerial vehicle is in the attached state. To prevent these network components from sending data unnecessarily, the attached parasite aerial vehicle's components are commanded to reduce data rates or shut off completely. Examples include shutting off the parasite aerial vehicle's video streams, reducing video frame rate, or increasing the compression of the video streams. These components can be commanded to return data rates to normal when released from the host aircraft.

When the parasite aerial vehicle is attached to the host aircraft, the GNSS signals used to estimate global position may be attenuated due to not having a clear view of the sky. To obtain a more accurate parasite aerial vehicle position estimate, prior to release, GNSS data from the host aircraft may be transmitted to the parasite aerial vehicles over radio. Upon release, the GNSS data coming from the host aircraft can be ignored, and instead, the parasite aerial vehicle's autopilot may use its own onboard GNSS data from its own GNSS receiver/antenna.

Operating at high power, the radio onboard the attached parasite aerial vehicle may saturate the radios of the nearby attached parasite aerial vehicles, leading to possible radio damage or to faulty radio transmissions. This situation can be prevented in either or both of the following two ways: (1) when a parasite aerial vehicle is in the attached state, the transmit power of its onboard radio is reduced, having the added advantage of conserving the parasite aerial vehicles' battery power during transit; (2) the radio signals coming from or going to the antennas are switched through signal attenuators if the parasite aerial vehicle is attached.

Figure 9:
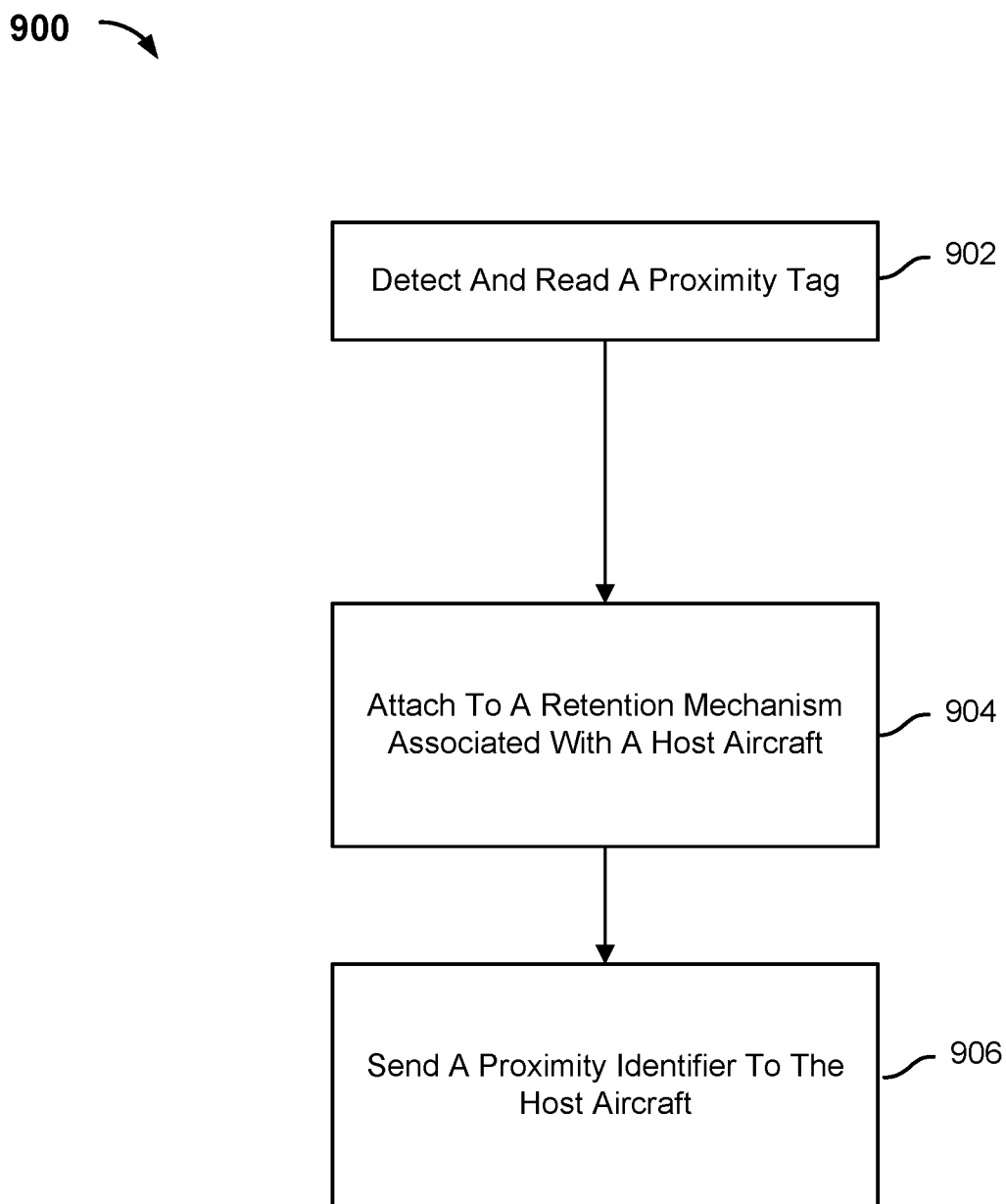
FIG. 9 is a flow diagram illustrating an embodiment of a process for registering a parasite aerial vehicle.

FIG. 9 is a flow diagram illustrating an embodiment of a process for registering a parasite aerial vehicle. In the example shown, process 900 may be implemented by a parasite aerial vehicle, such as parasite aerial vehicles 112, 122, 132.

At 902, a proximity tag is detected and read. A parasite aerial vehicle may include a proximity sensor. The proximity sensor includes a device that reads data from or detects proximity tags. A host aircraft is coupled to a retention mechanism that includes one or more embedded proximity tags that are associated with a corresponding placement location on the retention mechanism. The parasite aerial vehicle includes an opening that enables it to move up and down the retention mechanism. The parasite aerial vehicle may be positioned at one of the placement locations on the retention mechanism.

At 904, the parasite aerial vehicle is attached to a retention mechanism associated with a host aircraft. A proximity sensor is configured to scan for the presence of a proximity tag. When a proximity tag is detected, the proximity sensor provides the proximity identifier to the microcontroller. In response to receiving the proximity identifier, the microcontroller is configured to send to a motive device of the parasite aerial vehicle a command to insert a release pin into an attachment opening associated with the retention mechanism.

In some embodiments, step 904 is performed before step 902.

At 906, a proximity identifier is sent to the host aircraft. The parasite aerial vehicle uses a radio to communicate the proximity identifier to the host aircraft. After the parasite aerial vehicle is registered with the host aircraft, the parasite aerial vehicle may switch from a high power state to a low power state to conserve battery power. In some embodiments, the radio of the parasite aerial vehicle is operating in a reduced radio power state when the parasite aerial vehicle is in the low power state. In some embodiments, a data rate associated with the parasite aerial vehicle is operating in a reduced data rate state when the parasite aerial vehicle is in the low power state. For example, a camera data rate for the parasite aerial vehicle is reduced or turned off. The parasite aerial vehicle may be put into a dormant mode.

In some embodiments, a parasite aerial vehicle is configured to switch from a low power state to a high power state immediately prior to or after being deployed. In some embodiments, the host aircraft performs a system check (e.g., camera check, radio check, etc.) on the parasite aerial vehicle prior to launch. In such a scenario, the parasite aerial vehicle may be in a high power state just prior to launch.

Figure 10:
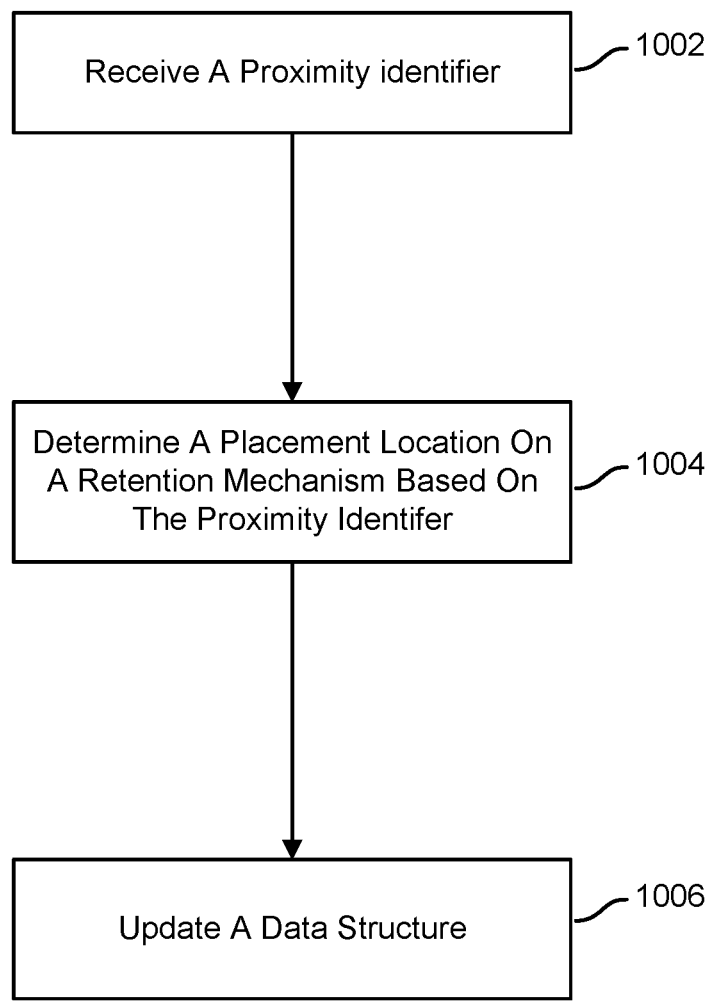
FIG. 10 is a flow diagram illustrating an embodiment of a process for registering a parasite aerial vehicle.

FIG. 10 is a flow diagram illustrating an embodiment of a process for registering a parasite aerial vehicle. In the example shown, process 1000 may be implemented by an aircraft, such as host aircraft 102.

At 1002, a proximity identifier is received. A host aircraft is coupled to a retention mechanism that includes a plurality of placement locations. Each placement location is associated with a corresponding proximity tag. Each proximity tag is associated with a corresponding proximity identifier. The proximity identifier is received from a parasite aerial vehicle that is attached to the retention mechanism at one of the placement locations.

At 1004, a placement location on a retention mechanism is determined based on the proximity identifier. The retention mechanism may include an embedded proximity tag which contains a list of all of the proximity identifiers on the retention mechanism ordered by position on the retention mechanism. The host aircraft may compare the received proximity identifier with the list to determine the placement location.

At 1006, a data structure is updated. The host aircraft stores a data structure that associates parasite aerial vehicles with the corresponding placement location on the retention mechanism. The data structure may include fields, such as a location on the retention mechanism, an IP address associated with a parasite aerial vehicle, and/or a proximity tag of the location on the retention mechanism. For example, the data structure may have the following form:

| IP Address | Location on Retention Mechanism | Proximity Identifier |
|---|---|---|
| 192.168.0.1 | 1 | e38f8g0 |
| ... | 2 | ... |
| ... | ... | ... |

When the host aircraft has reached a deployment location and is ready to deploy one or more parasite aerial vehicles, the host aircraft may inspect the data structure to determine the order in which the one or more parasite aerial vehicles are to be deployed. This may prevent a parasite aerial vehicle from being accidentally deployed out of order and damaging other parasite aerial vehicles attached to the retention mechanism.

Figure 11:
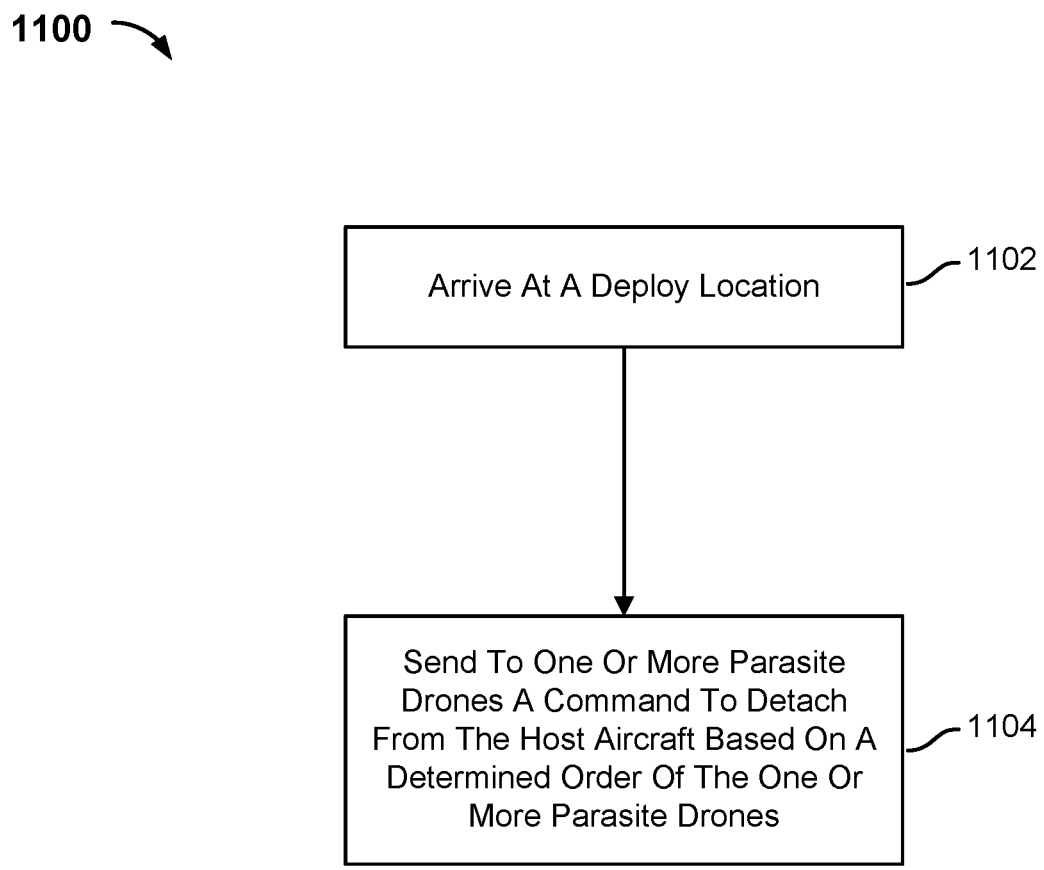
FIG. 11 is a flow diagram illustrating an embodiment of a process for deploying one or more parasite aerial vehicles.

FIG. 11 is a flow diagram illustrating an embodiment of a process for deploying one or more parasite aerial vehicles. In the example shown, process 1100 may be implemented by an aircraft, such as host aircraft 102.

At 1102, the host aircraft arrives at a deployment location. The deployment location may correspond to a location that is near a region of interest, but the host aircraft is unable to be detected at the deployment location.

At 1104, a command to detach from the host aircraft is sent to one or more parasite aerial vehicles based on a determined order of the one or more parasite aerial vehicles. The one or more parasite aerial vehicles are attached to a retention mechanism that is coupled to the host aircraft. The determined order for the one or more parasite aerial vehicles is a bottom-up order. In response to receiving the command, a motive device of the parasite aerial vehicle is configured to remove a release pin from an attachment opening of the retention mechanism. Subsequently, gravity causes the parasite aerial vehicle to slide down the retention mechanism.

Figure 12:
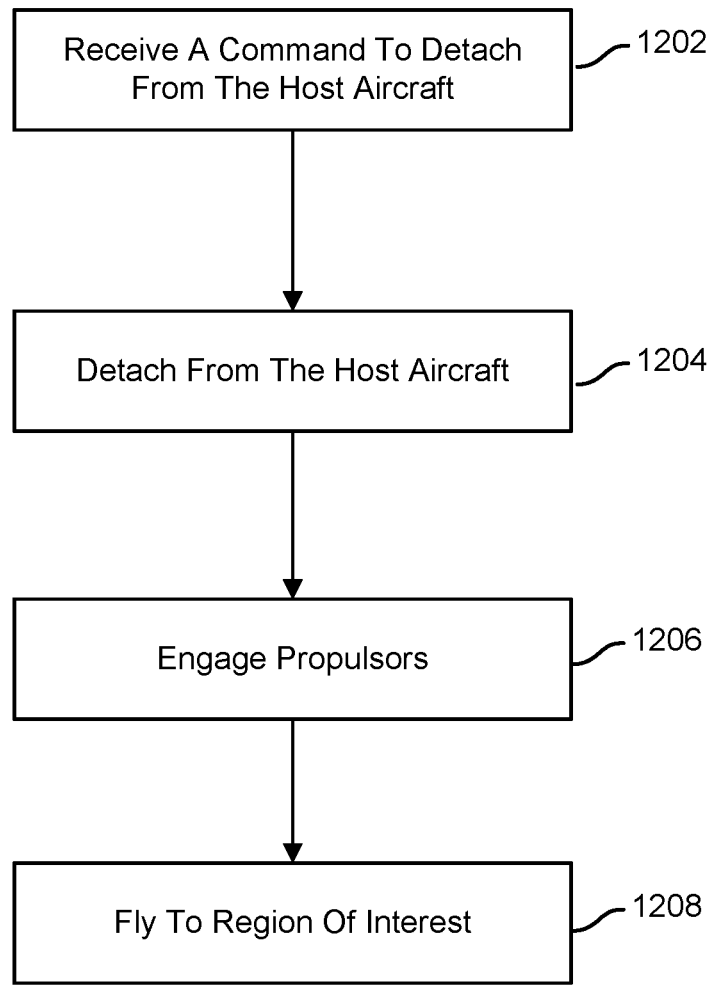
FIG. 12 is a flow diagram illustrating an embodiment of a process for deploying a parasite aerial vehicle.

FIG. 12 is a flow diagram illustrating an embodiment of a process for deploying a parasite aerial vehicle. In the example shown, process 1200 may be implemented by a parasite aerial vehicle, such as parasite aerial vehicles 112, 122, 132.

At 1202, a command to detach from the host aircraft is received. At 1204, a parasite aerial vehicle is detached from the host aircraft. In response to receiving the command, a motive device of the parasite aerial vehicle is configured to remove a release pin from an attachment opening of the retention mechanism.

At 1206, the propulsors are engaged. After a delay, the propulsors of the parasite aerial vehicle are engaged, allowing the parasite aerial vehicle to gain separation from host aircraft and then fly under its own power. In some embodiments, the delay is a fixed amount of time. The amount of delay may prevent the parasite aerial vehicle from accidentally colliding with other parasite aerial vehicles that are to be deployed. The amount of delay may also prevent the parasite aerial vehicle 132 from accidentally crashing due to the inability of parasite aerial vehicle to overcome the acceleration forces from gravity.

In some embodiments, the delay is variable and based one or more factors, such as a current altitude of the host aircraft, the number of other parasite aerial vehicles attached to the host aircraft via a retention mechanism, current environmental conditions (e.g., wind, snow, rain, temperature, etc.), etc.

At 1208, the parasite aerial vehicle flies to a region of interest. The region of interest may be a GPS coordinate, a particular location, an area having defined boundaries, etc. In some embodiments, the parasite aerial vehicle autonomously flies to the region of interest. In some embodiments, the parasite aerial vehicle is remotely controlled from a ground control station via the host aircraft.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving at a carrier aerial vehicle system a plurality of proximity identifiers associated with a plurality of proximity tags included in a retention mechanism;
determining a corresponding placement location for a plurality of parasite aerial vehicles on the retention mechanism based on the plurality of proximity identifiers, wherein the retention mechanism is inserted through a portion of the plurality of parasite aerial vehicles;
updating a data structure that indicates corresponding placement locations for the plurality of parasite aerial vehicles on the retention mechanism;
determining an order to deploy the plurality of parasite aerial vehicles based on the data structure; and
deploying the plurality of parasite aerial vehicles in the determined order.

2. The method of claim 1, wherein each of the plurality of tags are associated with the corresponding placement location for the plurality of parasite aerial vehicles on the retention mechanism.

3. The method of claim 1, wherein each of the plurality of tags are associated with a corresponding pre-programmed identifier.

4. The method of claim 1, wherein the retention mechanism includes an embedded proximity tag that indicates all of the proximity identifiers on the retention mechanism ordered by position on the retention mechanism.

5. The method of claim 4, wherein determining a corresponding placement location for a plurality of parasite aerial vehicles on the retention mechanism includes comparing a received proximity identifier with the proximity identifiers indicated by the embedded proximity tag.

6. The method of claim 1, wherein the data structure associates an internet protocol address associated with one of the parasite aerial vehicles with the corresponding placement location and a corresponding proximity identifier.

7. The method of claim 1, wherein the plurality of parasite aerial vehicles are deployed in response to the carrier aerial vehicle system arriving at a deployment location.

8. The method of claim 1, wherein deploying the plurality of parasite aerial vehicles in the determined order includes providing to each of the plurality of parasite aerial vehicles a command to detach from the carrier aerial vehicle system based on the determined order.

9. The method of claim 8, wherein in response to receiving the command a parasite aerial vehicle detaches from the retention mechanism.

10. The method of claim 1, wherein the determined order is a bottom-up order.

11. The method of claim 1, wherein the carrier aerial vehicle system communicates with a ground control station via a first frequency and communicates with the plurality of parasite aerial vehicles via a second frequency.

12. The method of claim 1, further comprising relaying data received from the plurality of parasite aerial vehicles to a ground control station.

13. The method of claim 1, further comprising relaying data received from a ground control station to the plurality of parasite aerial vehicles.

14. The method of claim 1, further comprising authenticating each of the plurality of parasite aerial vehicles.

15. The method of claim 1, wherein the retention mechanism is detachable from the carrier aerial vehicle system.

16. A system, comprising:
 a communication interface configured to receive a plurality of proximity identifiers associated with a plurality of proximity tags included in a retention mechanism;
 a processor coupled to the communication interface and configured to:
  determine a corresponding placement location for a plurality of parasite aerial vehicles on the retention mechanism based on the plurality of proximity identifiers wherein the retention mechanism is inserted through a portion of the plurality of parasite aerial vehicles;
  update a data structure that indicates corresponding placement locations for the plurality of parasite aerial vehicles on the retention mechanism;
  determine an order to deploy the plurality of parasite aerial vehicles based on the data structure; and
  deploy the plurality of parasite aerial vehicles in the determined order.

17. The system of claim 16, wherein the retention mechanism includes an embedded proximity tag that indicates all of the proximity identifiers on the retention mechanism ordered by position on the retention mechanism.

18. The system of claim 17, wherein to determine a corresponding placement location for a plurality of parasite aerial vehicles on the retention mechanism, the processor is configured to compare a received proximity identifier with the proximity identifiers indicated by the embedded proximity tag.

19. The system of claim 16, wherein each of the plurality of tags are associated with the corresponding placement location for the plurality of parasite aerial vehicles on the retention mechanism.

20. A computer program product embodied in a non-transitory computer readable medium and comprising computer instructions for:
 receiving a plurality of proximity identifiers associated with a plurality of proximity tags included in a retention mechanism;
 determining a corresponding placement location for a plurality of parasite aerial vehicles on the retention mechanism based on the plurality of proximity identifiers, wherein the retention mechanism is inserted through a portion of the plurality of parasite aerial vehicles;
 updating a data structure that indicates corresponding placement locations for the plurality of parasite aerial vehicles on the retention mechanism;
 determining an order to deploy the plurality of parasite aerial vehicles based on the data structure; and
 deploying the plurality of parasite aerial vehicles in the determined order.

* * * * *